3,251,587
ROTARY KILN
Stanley R. Pavlica, Irwin, Pa., assignor to Harbison-Walker Refractories Company, Pittsburgh, Pa., a corporation of Pennsylvania
Filed July 22, 1965, Ser. No. 474,133
6 Claims. (Cl. 263—33)

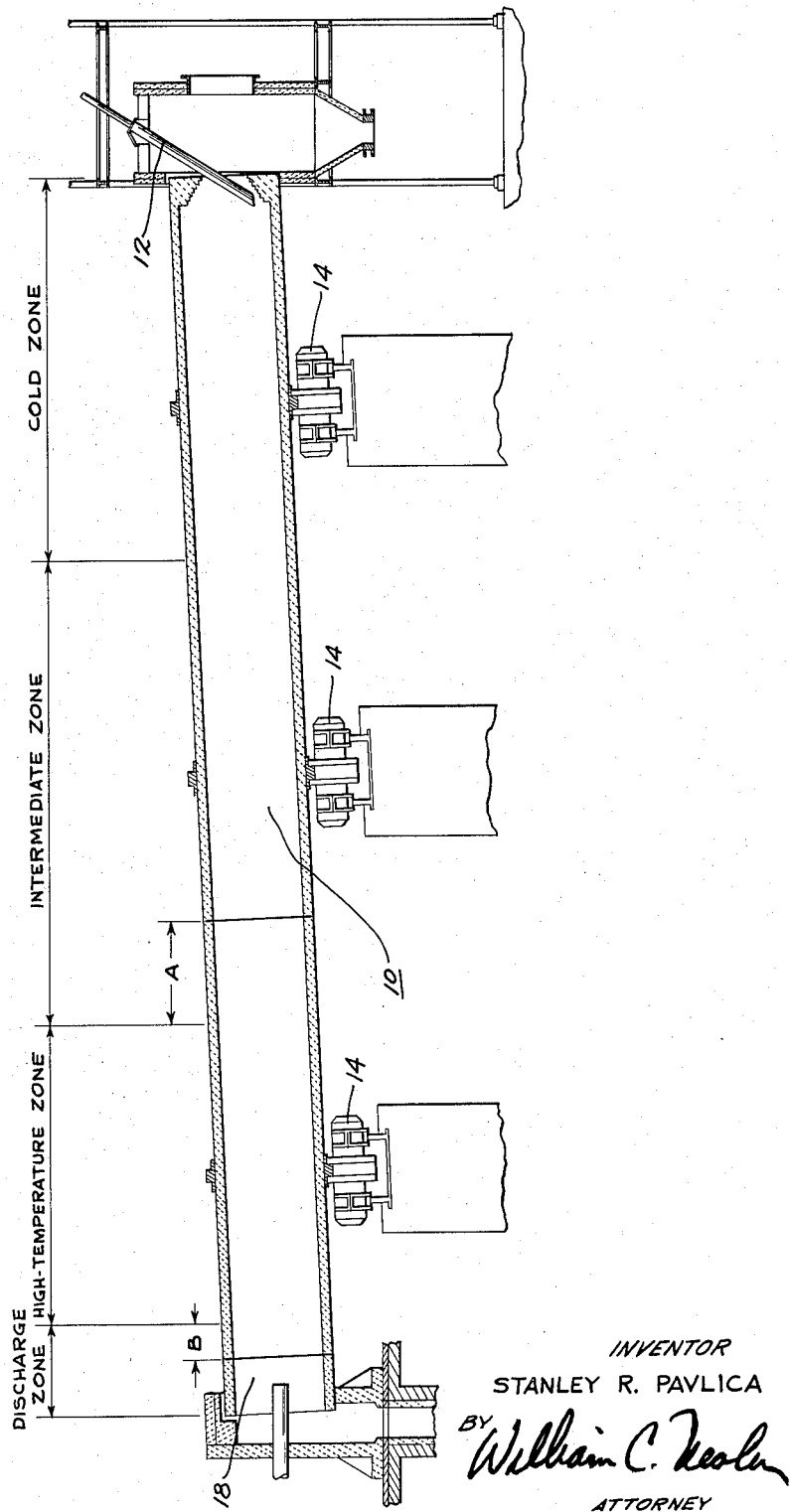

This application is a continuation-in-part of copending application Serial No. 353,540, assigned to a common assignee.

The present invention relates to a rotary kiln having an unburned, high temperature refractory brick lining therefor.

In contemporary rotary kilns, and other environments subjected to similar or analogous operating conditions, such as hot metal transfer ladles and metal mixers, a wide diversity of uses and increasingly rigorous conditions, imposed by high operating temperatures and/or greater chemical activity of materials in contact with linings, has necessitated the use of refractories not heretofore available or economically feasible.

For example, modern day rotary kilns are used for producing cement clinker, lime, and calcined dolomite. Thousands of these kilns are in operation throughout the world. Rotary kilns are also used in the processing or manufacture of phosphates, alumina, magnesia, titania, zirconia, carbon or coke, manganese dioxide, lightweight aggregates and ores of iron, chromium, lithium, and uranium; for calcining clay and bauxite, reduction of some metals, the burning of sulfur, etc. The temepratures reached in the high temepratures zone of the kiln range up to 2900° F. and sometimes as high as 3200° F.

One of the problems that has arisen is that the charged materials, for instance, cement and lime, become pasty just before entering the high temperature of firing zone. Thus, a temporary coating of the charge material tends to build up adjacent the hot zone. That is, a coating builds up for a short period of time and then flakes off the walls of the kiln and deposits itself in the firing zone which disrupts the uniform flow of charge material. Other materials such as alumina, magnesia, and zirconia, adhere permanently in the area adjacent the hot zone and form a ring around the inner periphery of the kiln which impedes the continuous flow of the charge material. The kiln may have to be shut down and the ring coating removed by shot blasting and the like.

Accordingly, it is an object of the present invention to provide in combination with a rotary kiln, a novel, unburned, high temperature refractory brick that is substantially nonwettable by charge materials in the kiln.

Another object of the invention is to provide, in combination with a rotary kiln or the like, an unburned refractory brick of relatively high density, mechanical strength, and abrasion resistance.

Other objects of the invention will appear hereinafter.

In order to more fully understand the nature and scope of the invention, reference should be had to the following detailed description and drawing, the single figure of which is a longitudinal section of a typical rotary kiln.

Briefly, in accordance with an embodiment, the present invention comprises a rotary kiln having a high temperature zone, preceded by a preheating zone and followed by a discharge zone. Other zones may be present in the kiln depending on design requirements or preferences. At least a portion of the zone preceding and that zone following the high temperature zone, immediately adjacent said high temperature zone, are lined with special unburned, high temperature refractory brick. These brick are made from a bath consisting of from 65 to 75%, by weight, of calcined South American bauxite, the balance flint clay. The batch is bonded into brick with concentrated phosphoric acid in an amount to provide $P_2O_5$ equivalent to that provided by about 3 to 5% of 85% phosphoric acid.

The flint clay may be either crude or calcined. However, a mixture of the two is preferred. Accordingly, the mixture contains about from 10 to 20%, by weight, of calcined flint fireclay, and from about 10 to 15% of crude flint clay. About 30 to 35% of bauxite is added as ball mill fines (—65 mesh) of which about 60 to 70% passes a 150 mesh screen (—150 mesh). A typical analysis of the bauxite material is as follows: about 89% $Al_2O_3$, about 6.2% $SiO_2$, about 3.1% $TiO_2$, about 1.5% $Fe_2O_3$, the remainder—alkalies and trace impurities The analysis of suitable clay appears later.

In practice, the brick are formed simply and economically as follows. The above named components are size graded and combined as a batch to which is added from about 3 to 5%, by weight, of 85% phosphoric acid and from 1 to 3%, by weight, of a tempering agent, such as, water. Other tempering agents, for instance, sulfite waste liquor, may also be used. The batch ingredients are blended in a mixer, such as Simpson or Clearfield mixer, to a brickmaking consistency. The batch is compressed in a brickmaking press at a pressure in the range about 3000 to 8000 p.s.i. The resulting brick are cured at a temperature of about 450 to 600° F.

It is known in the art that bauxitic materials, as mined, are generally inert with respect to reaction with phosphoric acid. However, by specifically size grading the bauxitic material so that a suitable proportion of it passes a 150 mesh screen, that proportion reacts with phosphoric acid to form aluminum phosphate which binds coarser particles when pressed shapes made therefrom are subsequently cured at an elevated temperature. About 15 to 25% of a —150 mesh bauxite fraction is considered adequate for the purposes of the invention.

Referring to the figure, there is shown a rotary kiln 10 having in sequence, a cold zone, intermediate zone, high temperature zone, and discharge zone. The charge material is fed through a conduit 12 and systematically passes through each of the zones at a rate depending upon the slope of the kiln and the speed at which the kiln is turned or rotated by rollers 14. As the charge material passes through the intermediate zone, it tends to become tacky or sticky especially within that portion of the intermediate zone designated A adjacent the high temperature zone. Also, the material again tends to become tacky and sticky after passing from the high temperature zone and into the discharge zone, particularly within that portion designated B of said latter zone. It is in these areas designated A and B that the brick composition of the present invention is employed. As these brick are nonwettable by refractory materials, metals, and slag, the coating rings formed heretofore have been eliminated. The remainder of the discharge zone lining and the cold zone lining may be composed of fireclay brick. The remainder of the intermediate zone lining may be composed of high alumina (70% +) brick and the firing zone lining may be composed of burned forsterite brick.

The following example is illustrative of the practice of this invention. All parts and percentages are by weight. All chemical analyses are on the basis of an oxide analysis, in conformity with the general practice of reporting the chemical analyses of materials. All size grading or mesh indications are according to the standard (Tyler) series. Of course, all size gradings and chemical analyses should be considered but typical.

Example I

About 72% of −4 mesh calcined South American bauxite (32% was ball mill fines of which 65% passes a 150 mesh screen), about 13% of calcined flint fireclay, and about 15% of crude flint clay were intimately mixed in a Simpson mixer for two minutes. About 3.5% of 85% phosphoric acid and about 2.5% of water were added to the batch which then was mixed for 8 minutes. The resulting batch mixture was formed into shapes on a power press at a pressure of 5,000 p.s.i. The resulting shapes were dried at 250° F. and then cured at 600° F. After curing, the shapes had an average density of 172 p.c.f., an average modulus of rupture of 1500 p.s.i., and an average linear subsidence at 2640° F. under a 25 p.s.i. load of 1.6%.

The calcined flint employed was −4 +65 mesh and analyzed typically about 55% $SiO_2$, about 35% $Al_2O_3$, about 2% $TiO_2$, about 2% $Fe_2O_3$, the remainder being CaO, MgO and alkalies. The crude flint clay employed was substantially all −100 mesh analyzed about 50% $SiO_2$, about 35% $Al_2O_3$, about 2% $TiO_2$, about 2% $Fe_2O_3$, the remainder being CaO, MgO and alkalies with about a 10% ignition loss. The overall size grading of the batch was typically as follows: −4 on 10 mesh—about 15%, −10 on 28 mesh—about 20%, −28 on 65 mesh—about 20%, pass 150 mesh—about 45%.

The brick are employed to line the interior of the intermediate and discharge zones at the portions designated A and B. The fired portions A and B are not coated by refractory charge materials, molten metals, and slags.

It can be observed from the above example that the strength of the brick of the invention is relatively high. It is well known in the refractory art that the strength of refractory bodies bears a fairly direct relation to abrasion resistance. Modulus of rupture is a standard test in refractory studies. It is determined with simple apparatus, exhibits a good degree of precision, and gives an excellent measure of bonding strength. Its determination is often made in lieu of abrasion testing which required much more elaborate equipment. Thus, an empirical degree of abrasion resistance can be construed from this test. The abrasion resistance of the present rotary kiln lining is relatively high compared to prior linings.

It is intended that the foregoing description and drawing be construed as illustrative and not in limitation of the invention.

Having thus described the invention in detail and with sufficient particularity as to enable those skilled in the art to practice it, what is desired to have protected by Letters Patent is set forth in the following claims:

I claim:

1. In a rotary kiln suitable for burning a cement charge material comprising an outer cylindrical metal shell and a temperature zoned refractory lining therein, consisting of, in sequence, a cold zone, an intermediate zone, a high temperature zone and a discharge zone, in which the cold zone and a portion of the discharge zone are composed of fireclay brick, the high temperature zone is composed of forsterite brick, a portion of the intermediate zone is composed of high alumina brick, the improvement comprising the remaining portions of the intermediate and discharge zones immediately adjacent the high temperature zone being composed of an unburned, high temperature refractory brick prepared from a batch consisting essentially of, by weight, from about 65 to 75% of calcined South American bauxite, from about 10 to 20% calcined flint fireclay, from about 10 to 15% of crude flint clay, and being bonded with concentrated phosphoric acid in an amount to provide $P_2O_5$ equivalent to that provided by about 3 to 5% of 85% phosphoric acid, said brick having been cured at a temperature of from about 450 to 600° F., said remaining portions being characterized as ones where cement charge materials tend to become tacky and sticky, the refractory brick in the remaining portions of the intermediate and discharge zones being nonwettable by cement charge materials.

2. In combination with a rotary kiln containing a high temperature zone and at least one other temperature zone, an interior lining in at least a portion of said other zone immediately adjacent the high temperature zone which is substantially nonwettable by charge materials, said lining being fabricated from an unburned high temperature refractory brick prepared from a batch consisting essentially of, by weight, from about 65 to 75% of calcined South American bauxite and the balance substantially all flint fireclay, and being bonded with concentrated phosphoric acid in an amount to provide $P_2O_5$ equivalent to that provided by about 3 to 5% of 85% phosphoric acid, said brick having been cured at a temperature of from about 450 to 600° F.

3. The rotary kiln of claim 1 in which the refractory brick are characterized by a density of at least about 170 p.c.f. and a modulus of rupture of at least about 1200 p.s.i.

4. The rotary kiln of claim 1 in which from 30 to 35% of the bauxite is added as ball mill fines of which 60 to 70% is −150 mesh.

5. In combination with a rotary kiln having in sequence, a cold temperature zone, an intermediate temperature zone, a high temperature and a discharge zone, an interior abrasion resistant refractory lining in at least a portion of the intermediate zone and the discharge zone which are immediately adjacent the high temperature zone which is substantially nonwettable by refractory materials, metals and slag, composed of unburned high temperature refractory brick prepared from a batch consisting essentially of, by weight, from about 65 to 75% of calcined South American bauxite, from about 10 to 20% calcined flint fireclay, from about 10 to 15% of crude flint clay, and being bonded with concentrated phosphoric acid in an amount to provide $P_2O_5$ equivalent to that provided by about 3 to 5% of 85% phosphoric acid, said brick having been cured at a temperature of from about 450 to 600° F.

6. In combination with a rotary kiln containing a high temperature zone and at least one other temperature zone, an interior lining in at least a portion of said other zone immediately adjacent the high temperature zone which is substantially nonwettable by charge materials, said lining being fabricated from an unburned high temperature refractory brick prepared from a batch consisting essentially of, by weight, from about 70 to 75% of calcined South American bauxite, in which from 30 to 35% is added as ball mill fines of which 60 to 70% is −150 mesh, from about 10 to 20% of −4 +65 mesh calcined flint fireclay, from about 10 to 15% of −100 mesh crude flint clay, and being bonded with concentrated phosphoric acid in an amount to provide $P_2O_5$ equivalent to that provided by about 3 to 5% of 85% phosphoric acid, said brick having been cured at a temperature of from about 450 to 600° F.

References Cited by the Examiner

UNITED STATES PATENTS

| | | | |
|---|---|---|---|
| 775,887 | 11/1904 | Berger | 266—43 X |
| 2,220,701 | 11/1940 | Benner et al. | 263—33 |
| 2,992,930 | 7/1961 | Wheeler et al. | |

JOHN J. CAMBY, *Primary Examiner.*